United States Patent
Kim et al.

(10) Patent No.: US 9,891,457 B2
(45) Date of Patent: Feb. 13, 2018

(54) LIQUID CRYSTAL DISPLAY PANEL AND LIQUID CRYSTAL DISPLAY APPARATUS INCLUDING THE SAME

(71) Applicant: LG Display Co., Ltd., Seoul (KR)

(72) Inventors: Jinseong Kim, Goyang-si (KR); CheolSe Kim, Daegu (KR); JuHan Kim, Bucheon-si (KR); YongChan Park, Seoul (KR); Seungkyeom Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 143 days.

(21) Appl. No.: 14/968,523

(22) Filed: Dec. 14, 2015

(65) Prior Publication Data

US 2016/0187694 A1    Jun. 30, 2016

(30) Foreign Application Priority Data

Dec. 26, 2014 (KR) .......... 10-2014-0191045

(51) Int. Cl.
| | |
|---|---|
| *G02F 1/1335* | (2006.01) |
| *G02F 1/1333* | (2006.01) |
| *G02F 1/1368* | (2006.01) |
| *G02F 1/1343* | (2006.01) |
| *G06F 3/044* | (2006.01) |
| *G06F 3/041* | (2006.01) |

(52) U.S. Cl.
CPC ........ *G02F 1/13338* (2013.01); *G02F 1/1368* (2013.01); *G02F 1/133512* (2013.01); *G02F 1/133514* (2013.01); *G02F 1/134309* (2013.01); *G06F 3/044* (2013.01); *G06F 3/0412* (2013.01); *G02F 2001/134345* (2013.01)

(58) Field of Classification Search
CPC .... G06F 3/0412; G06F 3/044; G02F 1/13338; G02F 1/1368; G02F 1/133514; G02F 1/133512; G02F 1/134309; G02F 2001/134345
USPC .......................................... 349/12
See application file for complete search history.

(56) References Cited

U.S. PATENT DOCUMENTS

| | | | |
|---|---|---|---|
| 9,098,134 B2* | 8/2015 | Lee | G06F 3/041 |
| 9,218,080 B2* | 12/2015 | Oh | G02F 1/13338 |
| 9,304,620 B2* | 4/2016 | Han | G06F 3/0412 |
| 2009/0289912 A1 | 11/2009 | Chen et al. | |
| 2011/0228188 A1* | 9/2011 | Kim | G02F 1/13338 349/43 |
| 2014/0111473 A1 | 4/2014 | Yang et al. | |
| 2014/0139490 A1 | 5/2014 | Hwang et al. | |
| 2014/0160066 A1 | 6/2014 | Kim et al. | |
| 2014/0168538 A1 | 6/2014 | Kim et al. | |

(Continued)

FOREIGN PATENT DOCUMENTS

| | | |
|---|---|---|
| CN | 101825966 A | 9/2010 |
| CN | 102937852 A | 2/2013 |

(Continued)

*Primary Examiner* — Hoan C Nguyen
(74) *Attorney, Agent, or Firm* — Birch, Stewart, Kolasch & Birch, LLP

(57) ABSTRACT

A liquid crystal display panel and an LCD apparatus including the same, may include a thin film transistor (TFT) substrate including a touch electrode and a switching transistor that is disposed over a color filter (CF) substrate including a color filter, such that the TFT substrate is exposed to an outside of the LCD panel or LCD apparatus.

16 Claims, 7 Drawing Sheets

(56) References Cited

U.S. PATENT DOCUMENTS

2014/0184944 A1* 7/2014 Ma .................... G02F 1/134363
                                                        349/12
2015/0022501 A1    1/2015 Kita
2015/0363032 A1   12/2015 Hotelling et al.

FOREIGN PATENT DOCUMENTS

| CN | 104238171 A     | 12/2014 |
|----|-----------------|---------|
| JP | 2013-3829 A     | 1/2013  |
| JP | 2013-246289 A   | 12/2013 |
| JP | 2014-115613 A   | 6/2014  |
| JP | 2014-211685 A   | 11/2014 |
| KR | 10-2014-0076846 A | 6/2014 |
| TW | 201421441 A     | 6/2014  |

* cited by examiner

LIQUID CRYSTAL DISPLAY PANEL AND LIQUID CRYSTAL DISPLAY APPARATUS INCLUDING THE SAME

CROSS-REFERENCE TO RELATED APPLICATIONS

This application claims the benefit of the Korean Patent Application No. 10-2014-0191045 filed on Dec. 26, 2014 in the Republic of Korea, which is hereby incorporated by reference as if fully set forth herein.

BACKGROUND OF THE INVENTION

Field of the Invention

The present invention relates to a liquid crystal display panel, and particularly, to a liquid crystal display panel based on a twisted nematic (TN) mode and a liquid crystal display (LCD) apparatus.

Discussion of the Related Art

Touch panels are a type of input device that is included in display apparatuses, such as liquid crystal display (LCD) apparatuses, field emission displays (FEDs), plasma display panels (PDPs), electrophoretic displays (EPDs), and electrophoretic displays (EPDs), and enables a user to input information by directly touching a screen with a finger, a pen or the like while looking at the screen of the display device.

A method of manufacturing an LCD apparatus including a touch panel includes an add-on type, where a panel displaying an image and a touch panel that determines whether there is a touch are separately manufactured and bonded to each other, and an in-cell type where the touch panel is built into the panel displaying an image.

A liquid crystal display panel configuring an LCD apparatus among the display apparatuses may be implemented in a TN mode or an in-plane switching (IPS) mode.

Particularly, in a liquid crystal display panel using the TN mode, liquid crystal that is aligned to be twisted between an upper substrate and a lower substrate is controlled by a vertical electric field generated between the upper substrate and the lower substrate, and thus, the amount of light passing through the liquid crystal is controlled. In this instance, a switching transistor and a pixel electrode are disposed on the lower substrate of the liquid crystal display panel, and a black matrix, a color filter, an overcoating layer, a common electrode, and a column spacer are disposed on the upper substrate of the liquid crystal display panel.

In a liquid crystal display panel to which the in-cell type and the IPS mode are applied, a plurality of touch electrodes are disposed on the lower substrate.

However, in the liquid crystal display panel using the TN mode, it is difficult for the touch electrodes to be disposed on the lower substrate on which the switching transistor and the pixel electrode are disposed.

For example, when a user touches the upper substrate of the liquid crystal display panel using the TN mode where the touch electrodes are disposed on the lower substrate, an electric field generated based on a touch driving signal applied to the touch electrodes disposed on the lower substrate is cut off by the common electrode disposed on the upper substrate.

For this reason, it is difficult to implement the liquid crystal display panel using the TN mode and the in-cell type where the touch panel is included in the lower substrate.

SUMMARY OF THE INVENTION

Accordingly, the present invention is directed to provide a liquid crystal display panel and an LCD apparatus that substantially obviate one or more problems due to limitations and disadvantages of the related art.

An aspect of the present invention is directed to provide a liquid crystal display panel and an LCD apparatus including the same, in which a thin film transistor (TFT) substrate including a touch electrode and a switching transistor is disposed on a color filter (CF) substrate including a color filter to contact the outside.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a liquid crystal display panel including a thin film transistor (TFT) substrate including a plurality of touch electrodes, a plurality of subpixels respectively including a plurality of pixel electrodes, and a plurality of switching transistors, a color filter (CF) substrate including a plurality of common electrodes and a plurality of color filters respectively corresponding to the plurality of subpixels, and a liquid crystal layer disposed between the TFT substrate and the CF substrate, liquid crystal being injected into the liquid crystal layer, wherein each of the plurality of touch electrodes includes a touch line connected in common to two or more subpixels which are disposed on one horizontal line and are adjacent to each other, and a touch electrode line disposed to overlap a data line included in the TFT substrate and electrically connected to two or more touch lines which are adjacent thereto along the data line.

In another aspect of the present invention, there is provided a liquid crystal display (LCD) apparatus including a liquid crystal display panel including a plurality of touch electrodes, a panel driver driving the liquid crystal display panel, and a touch sensing unit determining whether the liquid crystal display panel is touched, based on a plurality of sensing signals respectively received from the plurality of touch electrodes, wherein the liquid crystal display panel includes: a thin film transistor (TFT) substrate including the plurality of touch electrodes, a plurality of subpixels respectively including a plurality of pixel electrodes, and a plurality of switching transistors, a color filter (CF) substrate including a plurality of common electrodes and a plurality of color filters respectively corresponding to the plurality of subpixels, and a liquid crystal layer disposed between the TFT substrate and the CF substrate, liquid crystal being injected into the liquid crystal layer. The TFT substrate is disposed on the CF substrate to contact an outside.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the embodiments of the present invention, examples of which are illustrated in the accompanying drawings. Wherever possible, the same reference numbers will be used throughout the drawings to refer to the same or like parts.

Hereinafter, embodiments of the present invention will be described in detail with reference to the accompanying drawings.

Figure 1:
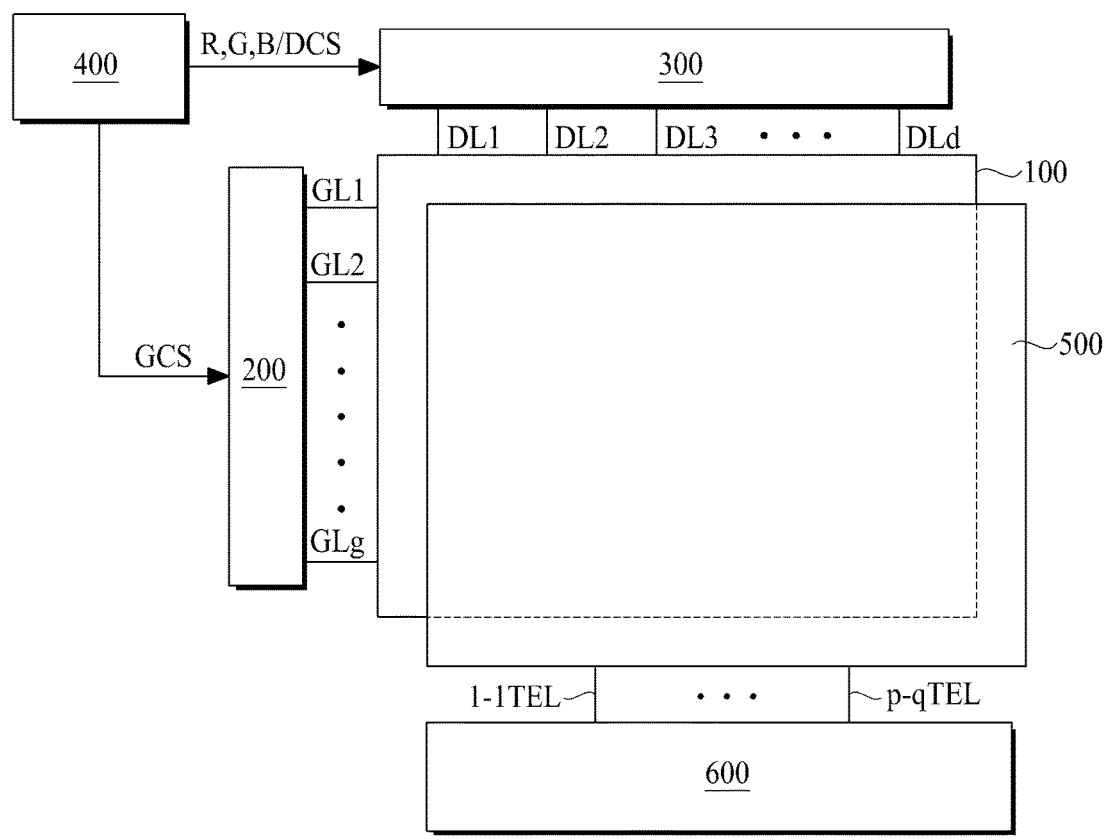
FIG. 1 is a diagram illustrating a configuration of an LCD apparatus according to an embodiment of the present invention.
Figure 2:
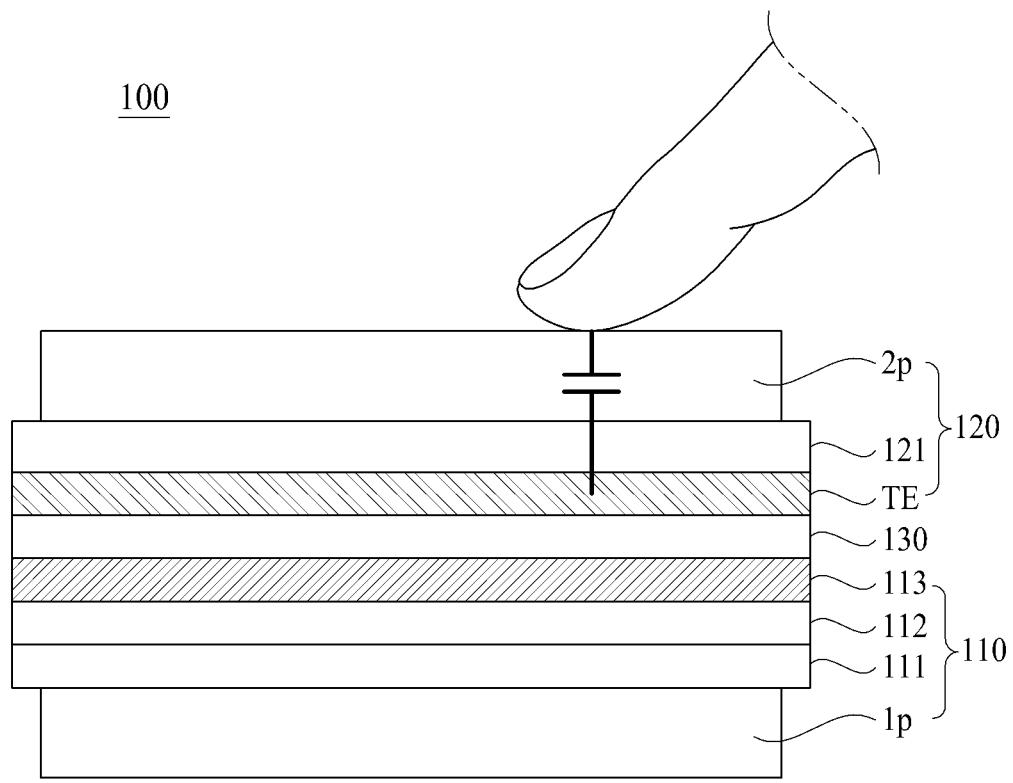
FIG. 2 is a diagram illustrating a cross-sectional surface of a liquid crystal display panel according to an embodiment of the present invention.

FIG. 1 is a diagram illustrating a configuration of an LCD apparatus according to an embodiment of the present invention, and FIG. 2 is a diagram illustrating a cross-sectional surface of a liquid crystal display panel according to an embodiment of the present invention.

As illustrated in FIGS. 1 and 2, the LCD apparatus according to an embodiment of the present invention may include a liquid crystal display panel 100 that includes a plurality of touch electrodes TE, a panel driver 200, 300 and 400 that drives the liquid crystal display panel 100, and a touch sensing unit 600 that determines whether the liquid crystal display panel 100 is touched, based on a plurality of sensing signals respectively received from the touch electrodes TE.

The liquid crystal display panel 100 may include: a thin film transistor (TFT) substrate 120 that includes the touch electrodes TE, a plurality of subpixels respectively including a plurality of pixel electrodes, and a plurality of switching transistors; a color filter (CF) substrate 110 that includes a plurality of color filters 112, respectively corresponding to the plurality of subpixels, and a plurality of common electrodes 113; and a liquid crystal layer 130 that is disposed between the TFT substrate 120 and the CF substrate 110 and into which liquid crystal is injected.

Each of the touch electrodes TE may include: a touch line that is connected in common to two or more subpixels which are disposed on one horizontal line and are adjacent to each other; and a touch electrode line TEL that is disposed to overlap a data line DL included in the TFT substrate 120, is electrically connected to two or more touch lines which are adjacent thereto along the data line DL, and is connected to the touch sensing unit 600.

Particularly, in the LCD apparatus according to an embodiment of the present invention, as illustrated in FIG. 2, the TFT substrate 120 may be disposed on the CF substrate 110 to contact the outside (e.g., the TFT substrate is closest to the user). In this instance, a backlight unit that irradiates light onto the liquid crystal display panel 100 may be disposed under the CF substrate 110.

First, the touch electrodes TE may configure a touch panel 500. The touch panel 500 according to an embodiment of the present invention may use a capacitive type and may be implemented as one body with the TFT substrate 110 configuring the liquid crystal display panel 100.

The touch panel 500 may be implemented in a mutual type or a self-capacitive type.

The touch panel 500 using the mutual type may include a plurality of driving electrodes, to which a touch driving signal is sequentially supplied, and a plurality of receiving electrodes which transfer the sensing signals generated based on the touch driving signal to the touch sensing unit 600. The touch electrodes TE may include the driving electrodes and the receiving electrodes.

The touch panel 500 using the self-capacitive type may include the touch electrodes TE that receive the touch driving signal and transfer the sensing signals to the touch sensing unit 600.

Hereinafter, for convenience of description, the touch panel 500 using the self-capacitive type will be described as an example of the present invention. An overall configuration and function of each of the touch electrodes TE configuring the touch panel 500 using the self-capacitive type will be described in detail with reference to FIGS. 3 to 7.

Second, the liquid crystal display panel 100 may display an image. A plurality of subpixels and the touch panel 500 may be disposed in the liquid crystal display panel 100.

The liquid crystal display panel 100 may be manufactured by bonding the TFT substrate 120 to the CF substrate 110 with the liquid crystal layer 130 therebetween.

The TFT substrate 120 may include a base substrate 121, and the CF substrate 110 may include a base substrate 111. The base substrates 111 and 121 may each be formed of plastic, metal, and/or the like.

Particularly, the liquid crystal display panel 100 according to an embodiment of the present invention may use the TN mode. Therefore, the liquid crystal injected into the liquid crystal layer 130 may be driven by the pixel electrode and the common electrode which are respectively included in the TFT substrate 120 and the CF substrate 110, and an image may be displayed according to a change in a light transmittance of the liquid crystal.

The base substrate 121 configuring the TFT substrate 120 may include a plurality of data lines DL1 to DLd, a plurality of gate lines GL1 to GLg intersecting the data lines DL1 to DLd, and the plurality of subpixels.

Each of the subpixels may include a switching transistor, which is connected to the gate line and the data line, and a pixel electrode that is connected to the switching transistor and is supplied with a data voltage through the switching transistor from the data line.

Particularly, the TFT substrate 120 may include the touch electrodes TE configuring the touch panel 500.

Moreover, in the LCD apparatus according to an embodiment of the present invention, as illustrated in FIG. 2, the TFT substrate 120 may be disposed on the CF substrate 110 to contact the outside (e.g., the TFT substrate is over the CF substrate 110 and the TFT substrate is closest to the user).

In this instance, since the touch electrodes TE are disposed on the common electrode 113 (e.g., between the user and the common electrode 113), an electric field generated based on the touch driving signal applied to the touch electrodes TE may not be cut off by the common electrode 113. Therefore, a touch may be sensed by using the touch electrodes TE.

A size of each of the subpixels may be smaller than that of each of the touch electrodes TE. Generally, an area of a finger, a pen, or the like used to sense a touch is far larger than that of each of the subpixels. Thus, one touch electrode TE may be disposed over two or more subpixels. The number of the subpixels which one touch electrode TE is disposed over may be variously changed.

An upper polarizing film 2P may be attached to an upper surface of the TFT substrate 120.

The base substrate 111 configuring the CF substrate 110 may include a plurality of color filters 112, having various colors, such as a red (R) color filter, a green (G) color filter, and a blue (B) color filter.

The common electrode 113 may be disposed on the color filter 112 (e.g., between the user and the color filter 112).

A lower polarizing film 1P may be attached to a lower surface of the CF substrate 110.

Third, the panel driver may include a controller 400, a gate driver 200, and a data driver 300.

The controller 400 may generate a gate control signal GCS for controlling the gate driver 200 and a data control signal DCS for controlling the data driver 300 by using a vertical sync signal, a horizontal sync signal, and a clock which are supplied from an external system.

Moreover, the controller 400 may sample and realign input image data supplied from the external system and may supply digital image data, obtained through the realignment, to the data driver 300.

Moreover, the controller 400 may generate a touch control signal for controlling the touch sensing unit 600 and may transfer the touch control signal to the touch sensing unit 600.

The data driver 300 may convert the image data, input from the controller 400, into analog data voltages and may respectively supply data voltages for one horizontal line to the data lines at every one horizontal period where the scan pulse is supplied to a corresponding gate line. For example, the data driver 300 may convert the image data into the data voltages by using gamma voltages supplied from a gamma voltage generator and may respectively output the data voltages to the data lines.

The gate driver 200 may sequentially supply a scan pulse to the gate lines GL1 to GLg of the liquid crystal display panel 100 in response to the gate control signal input from the controller 400. Therefore, a plurality of switching transistors which are respectively formed in a plurality of subpixels on a corresponding horizontal line to which the scan pulse is applied are turned on, and an image may be output to each of the subpixels.

The gate driver 200 may be provided independently from the liquid crystal display panel 100, and may be configured in a type which is electrically connected to the liquid crystal display panel 100 by various manners. However, the gate driver 200 may be configured in a gate-in panel (GIP) type which is equipped in the liquid crystal display panel 100.

Hereinabove, it has been described that the data driver 300, the gate driver 200, and the controller 400 are separately provided, but at least one selected from the data driver 300 and the gate driver 200 may be provided as one body with the controller 400.

Fourth, the touch sensing unit 600 may determine whether the touch panel 500 is touched and may detect a touched position, based on the sensing signals received from the touch panel 500.

For example, the touch sensing unit 600 may sequentially supply the touch driving signal to the touch electrodes TE disposed in the touch panel 500 and then, by using the sensing signals respectively received from the touch electrodes TE, the touch sensing unit 600 may determine whether the touch panel 500 is touched and may detect touch coordinates.

Since the touch panel 500 is implemented in the self-capacitive type as described above, the touch sensing unit 600 may also be implemented in the self-capacitive type.

The touch sensing unit 600, as illustrated in FIG. 1, may be connected to the touch electrode TE through a plurality of touch electrode lines 1-1TEL to p-gTEL.

Figure 3:
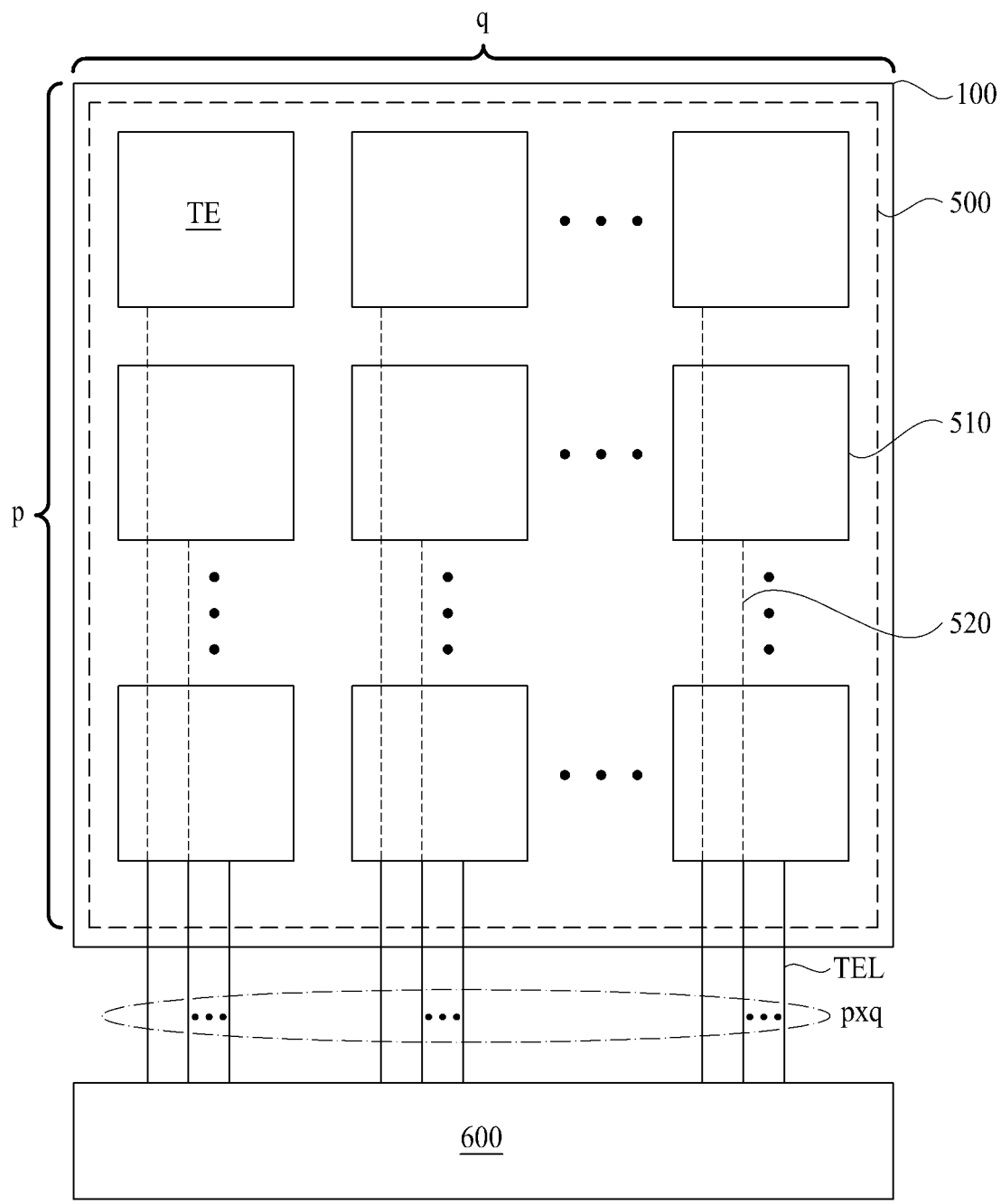
FIG. 3 is a diagram illustrating a configuration of each of a liquid crystal display panel and a touch sensing unit applied to an LCD apparatus according to an embodiment of the present invention.

FIG. 3 is a diagram illustrating a configuration of each of a liquid crystal display panel and a touch sensing unit applied to an LCD apparatus according to an embodiment of the present invention.

In the LCD apparatus using the self-capacitive type according to an embodiment of the present invention, as illustrated in FIG. 3, a touch electrode line TEL 520 connected to a touch electrode TE 510 may be connected to the touch sensing unit 600. Therefore, the number of touch electrode lines TEL 520 may correspond to a multiplication "p×q" of the number "q" of touch electrodes TE 510, which are arranged in a horizontal direction of the touch panel 500, and the number "p" of touch electrodes TE 510 which are arranged in a vertical direction of the touch panel 500.

Each of a plurality of touch electrodes TE 510 may be disposed over a plurality of subpixels provided in the liquid crystal display panel 100.

The plurality of touch electrode lines TEL 520 may be connected to the plurality of touch electrodes TE 510 in one-to-one correspondence relationship, and an end of each of the touch electrode lines TEL 520 may be connected to the touch sensing unit 600.

The touch electrode TE 510 configuring the touch panel 500 according to an embodiment of the present invention, as described above, may use the capacitive type and may be built into the liquid crystal display panel 100.

In a touch sensing mode, the touch sensing unit 600 may supply the touch driving signal to the touch electrodes 510 and may convert analog sensing signals, respectively received from the touch electrodes 510, into digital signals to determine whether there is a touch and detect a touched position.

However, the touch sensing unit 600 may perform only a function of converting the analog sensing signals, respectively received from the touch electrodes 510, into the digital signals. In this instance, the controller 400 or a separate element may determine whether there is the touch and may detect the touched position.

The touch sensing unit 600 may be implemented identically to a touch sensing unit applied to a display apparatus using the self-capacitive type.

Figure 4:
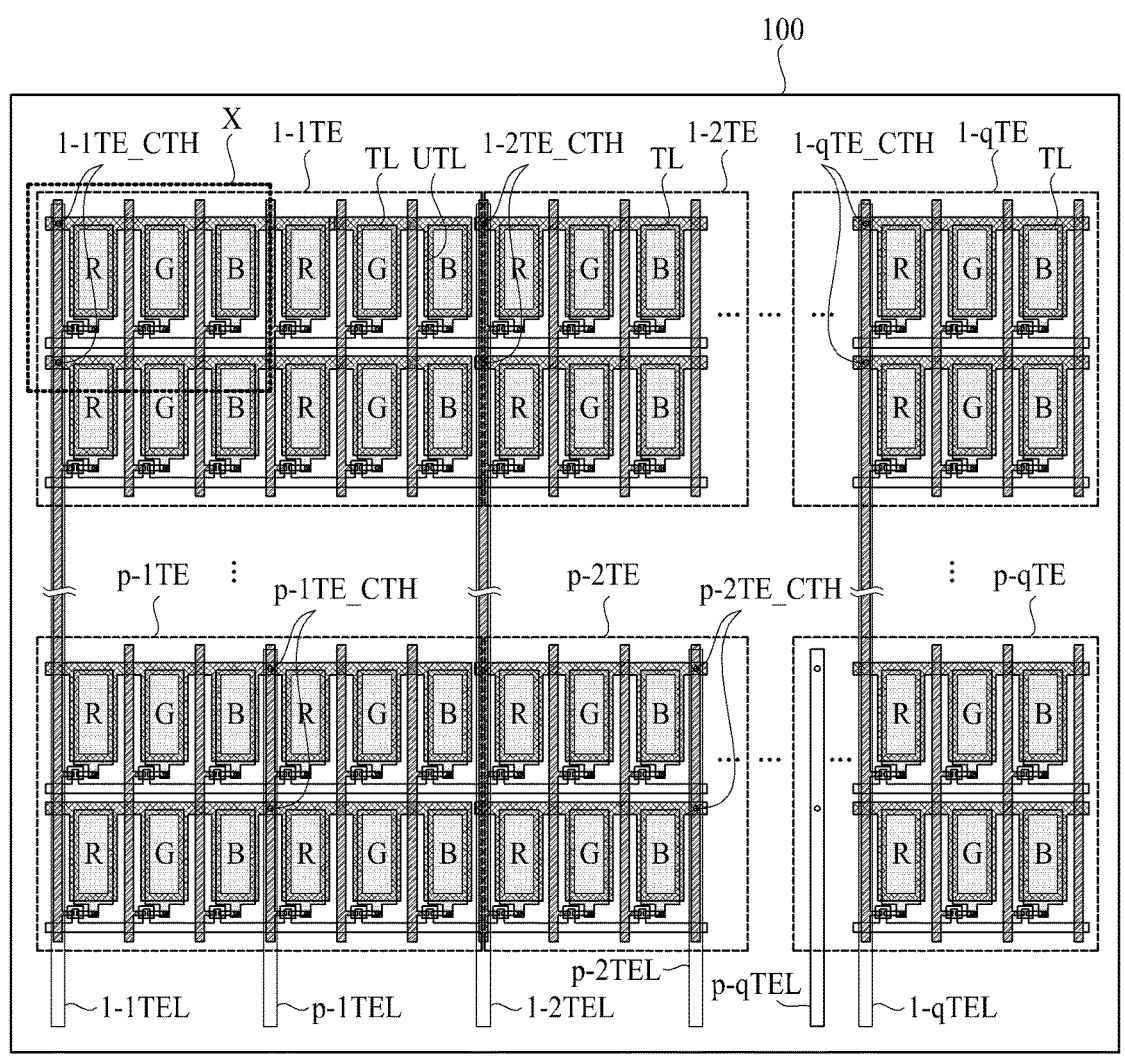
FIG. 4 is a diagram illustrating a plane of a liquid crystal display panel according to an embodiment of the present invention.
Figure 5:
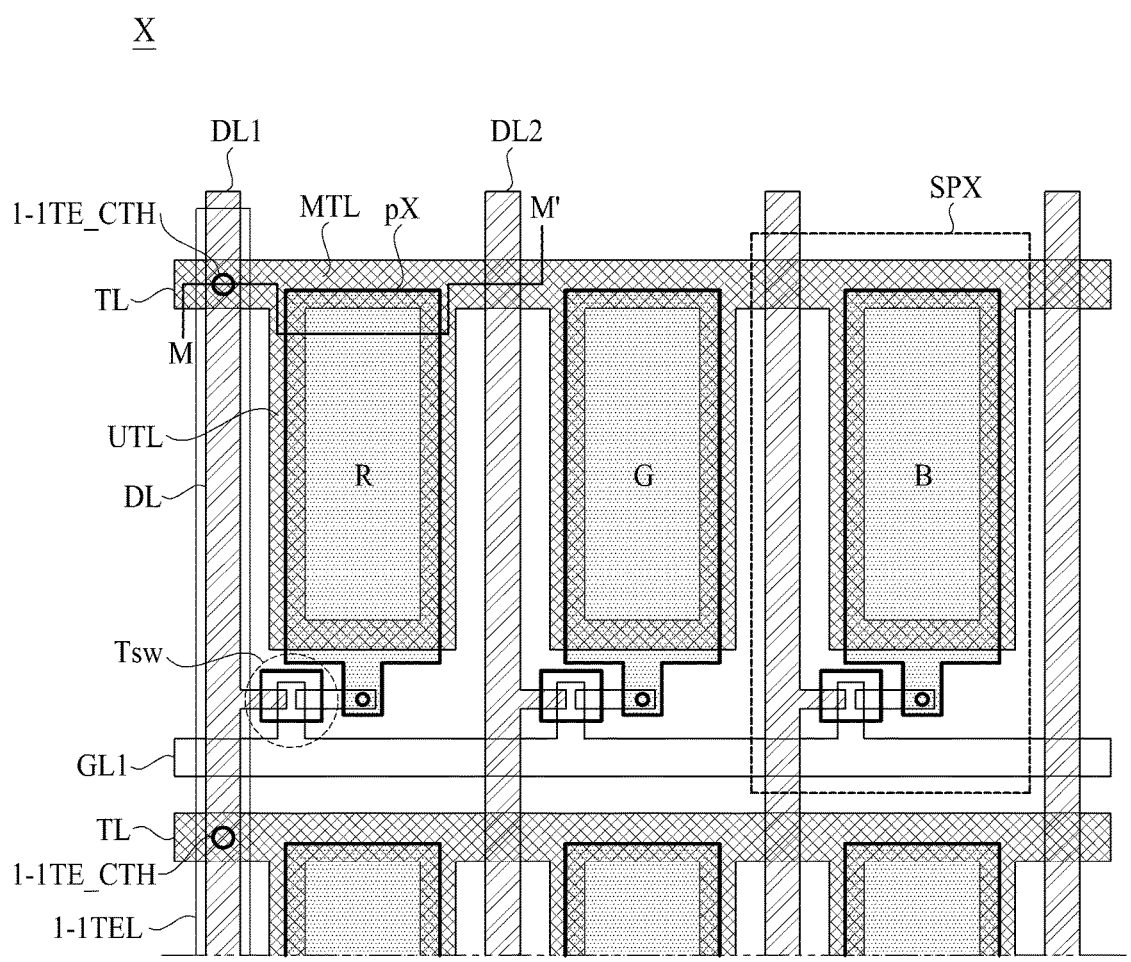
FIG. 5 is a diagram illustrating an enlarged X area of the liquid crystal display panel illustrated in FIG. 4.
Figure 6:
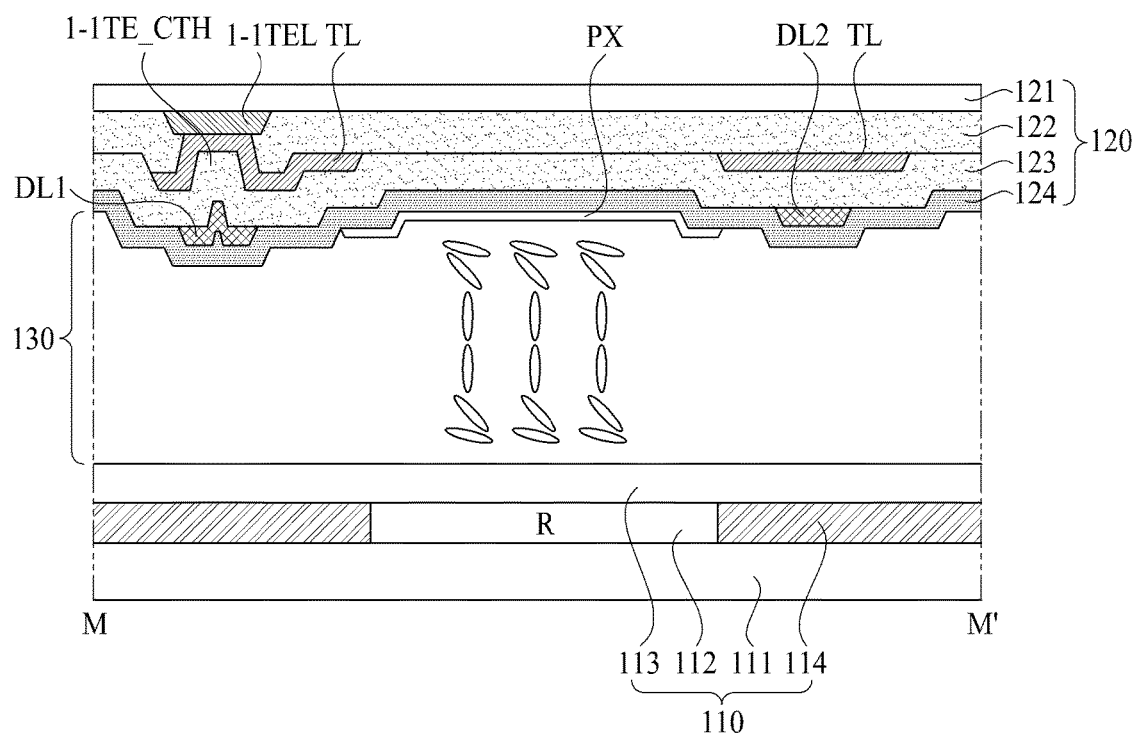
FIG. 6 is a diagram illustrating a cross-sectional surface taken along line M-M' of FIG. 5.

FIG. 4 is a diagram illustrating a plane of a liquid crystal display panel according to an embodiment of the present invention. FIG. 5 is a diagram illustrating an enlarged X area of the liquid crystal display panel illustrated in FIG. 4 according to an embodiment of the present invention. FIG. 6 is a diagram illustrating a cross-sectional surface taken along line M-M' of FIG. 5 according to an embodiment of the present invention.

As illustrated in FIGS. 2 to 6, the liquid crystal display panel according to an embodiment of the present invention may include: a TFT substrate 120 that includes a plurality of touch electrodes 1-1TE to p-qTE, a plurality of subpixels SPX including a plurality of pixel electrodes PX, and a plurality of switching transistors Tsw; a CF substrate 110 that includes a plurality of common electrodes 113 and a plurality of color filters 112 respectively corresponding to the subpixels SPX; and a liquid crystal layer 130 that is disposed between the TFT substrate 120 and the CF substrate 110 and into which liquid crystal is injected.

Each of the touch electrodes 1-1TE to p-qTE may include: a touch line TL that is connected in common to two or more subpixels SPX which are disposed on one horizontal line and are adjacent to each other; and a touch electrode line TEL that is disposed to overlap a data line DL included in the TFT substrate 120 and is electrically connected to two or more touch lines TL which are adjacent thereto along the data line DL.

First, as illustrated in FIG. 3, when the number of touch electrodes TE 510 arranged in a horizontal direction of the touch panel 500 is q number and the number of touch electrodes TE 510 arranged in a vertical direction of the touch panel 500 is p number, the touch panel 500 may include p×q number of touch electrodes 1-1TE to p-qTE.

In this instance, in the liquid crystal display panel 100 illustrated in FIG. 4, a touch electrode disposed on a left upper end may be referred to as a 1-1st touch electrode 1-1TE, and a touch electrode disposed on a right lower end may be referred to as a p-qth touch electrode p-qTE. The total number of touch electrodes illustrated in FIG. 4 may be p×q number.

Second, the TFT substrate 120 may include the touch panel 500, and the subpixels SPX may be disposed on the TFT substrate 120. Each of the subpixels SPX may include one pixel electrode PX, and each of the pixel electrodes PX may include one switching transistor Tsw.

Third, the CF substrate 110 may include the color filters 112 and the common electrodes 113. The common electrodes 113 may be implemented as one plate.

Fourth, each of the touch electrodes 1-1TE to p-qTE may include the touch line TL and the touch electrode line TEL.

In this instance, the touch line TL may be connected in common to two or more subpixels SPX that are disposed on one horizontal line and are adjacent to each other. The horizontal line, in FIGS. 4 and 5, may denote a line parallel to a gate line GL.

A plurality of touch lines TL respectively included in different touch electrodes TE may be spaced apart from each other.

Moreover, a plurality of touch lines TL included in the same touch electrode TE may be electrically connected to each other through the touch electrode lines TEL.

The touch electrode line TEL may be disposed to overlap the data line DL included in the TFT substrate 120 and may be electrically connected to two or more touch lines TL which are adjacent thereto along the data line LD.

For example, in FIG. 4, one touch electrode may include six subpixels that are adjacent to each other on one horizontal line. Also, in FIG. 4, the one touch electrode may include two touch lines TL disposed on two horizontal lines. The two touch lines TL may be electrically connected to each other through the touch electrode line TEL which is disposed to overlap the data line DL.

The touch electrode line TEL may be disposed to overlap the data line DL. Particularly, the touch electrode line TEL may be disposed to overlap a data line connected to one red subpixel R among a plurality of subpixels including the touch electrode.

For example, the 1-1st touch electrode 1-1TE may include a 1-1st touch electrode line 1-1TEL and two touch lines TL.

The 1-1st touch electrode line 1-1TEL, as illustrated in FIG. 5, may be electrically connected to two touch lines TL through a 1-1st touch electrode contact hole 1-1TE_CTH.

The 1-1st touch electrode line 1-1TEL, as illustrated in FIGS. 5 and 6, may be disposed on the TFT substrate 120 to overlap a first data line DL1.

Fifth, the touch line TL included in each of two or more subpixels adjacent to each other may include a main touch line MTL, which extends to a subpixel SPX adjacent thereto, and a unit touch line UTL that branches from the main touch line MTL. In this instance, a plurality of main touch lines MTL respectively included in a plurality of subpixels which include different touch electrodes and are adjacent to each other may not be connected each other.

The unit touch line UTL may be disposed along an outer portion of the pixel electrode PX included in each of the subpixels SPX.

To provide an additional description, the touch line TL included in each of two or more subpixels SPX adjacent to each other may be disposed in a tetragonal shape along an outer portion of a pixel electrode PX which is disposed in a subpixel SPX including the touch line TL.

For example, as illustrated in FIG. 5, a touch line TL included in the red subpixel R among a plurality of touch lines TL connected to the 1-first touch electrode line 1-1TEL may include a main touch line MTL extending to a plurality of subpixels SPX adjacent thereto and a unit touch line UTL branching from the main touch line MTL.

In this instance, the unit touch line UTL may be disposed in the subpixel SPX in a tetragonal shape along the outer portion of the pixel electrode PX.

As described above, the touch electrode TE cannot affect driving of the pixel electrode, and moreover prevents light from being leaked to a periphery of the pixel electrode.

Sixth, a configuration of the TFT substrate 120 will now be described with reference to FIG. 6.

The TFT substrate 120 may include the base substrate 121, the touch electrode lines TEL included in the base substrate 121, a first passivation layer 122 disposed on the touch electrode lines TEL, the touch lines TL disposed on the first passivation layer 122, a gate insulation layer 123 disposed on the touch lines TL, the data lines DL disposed on the gate insulation layer 123 to overlap the touch electrode lines TEL, a second passivation layer 124 disposed on the data line DL, and the pixel electrodes PX disposed on the second passivation layer 124.

Here, the touch line TL may be electrically connected to the touch electrode line TEL through the touch electrode contact hole TE_CTH formed in the first passivation layer 122.

For example, in FIG. 6, the 1-first touch electrode line 1-1TEL may be connected to the touch electrode TL through the 1-first touch electrode contact hole 1-1TE_CTH and may overlap a first data line DL1.

The first passivation layer 122, the gate insulation layer 123, and the second passivation layer 124 may each be formed of at least one of various kinds of inorganic materials or organic materials.

Hereinafter, an operation method of the LCD apparatus according to an embodiment of the present invention will be described with reference to FIG. 7.

Figure 7:
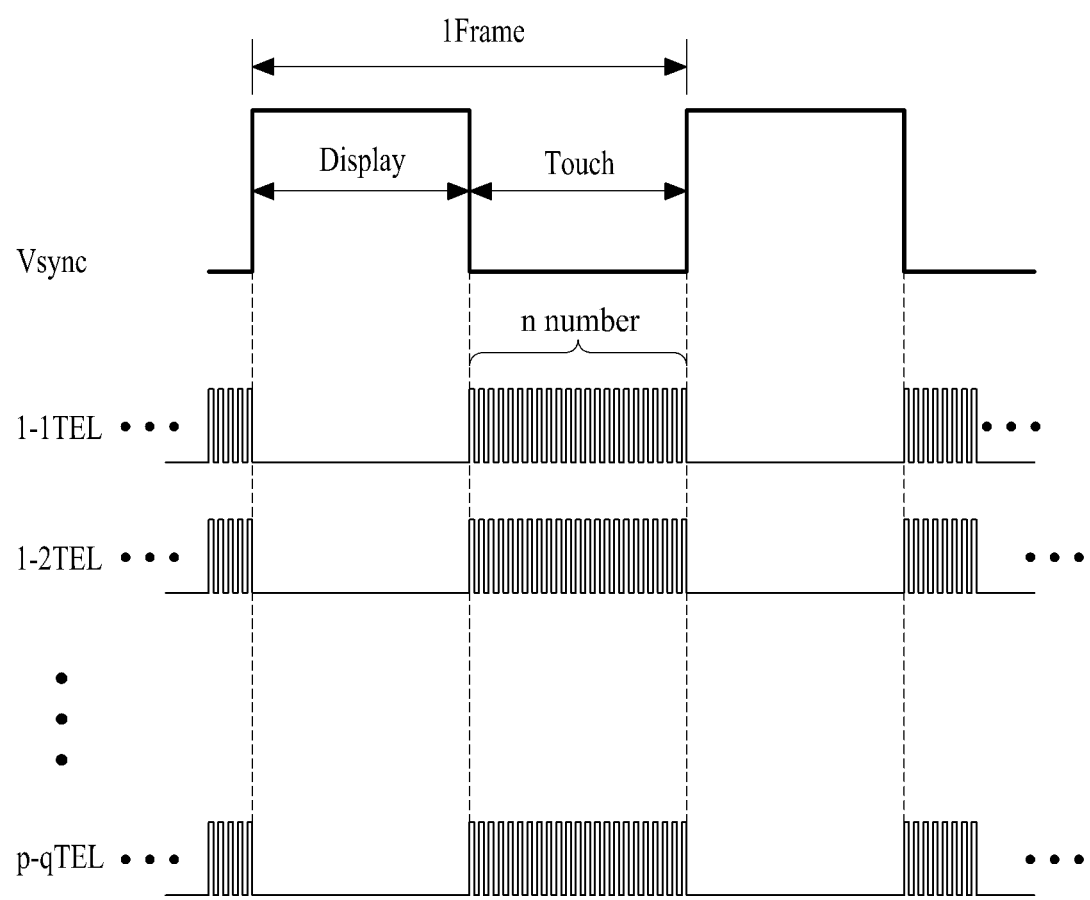
FIG. 7 is a diagram showing a timing when a touch driving signal is applied to a touch electrode in an LCD apparatus according to an embodiment of the present invention.

FIG. 7 is a diagram showing a timing when a touch driving signal is applied to a touch electrode in an LCD apparatus according to an embodiment of the present invention.

In the LCD apparatus using the self-capacitive type and the TN mode according to an embodiment of the present invention, as illustrated in FIG. 3, the touch electrode line 520 connected to the touch electrode 510 may be connected to the touch sensing unit 600.

When the number of touch electrodes 510 arranged in the horizontal direction is q number and the number of touch electrodes 510 arranged in the vertical direction is p number, the touch sensing unit 600 may include total p×q number of touch electrodes 520.

In the LCD apparatus according to an embodiment of the present invention, since the touch electrode 510 receiving the touch driving signal is built into the liquid crystal display panel 100, an image display operation and a touch sensing operation cannot be simultaneously performed. Therefore, as shown in FIG. 7, one frame period defined by a vertical sync signal Vsync may be divided into an image display period (Display) and a touch sensing period (Touch). A period where the liquid crystal display panel displays an image may be the image display period, and a period where a touch is sensed may be the touch sensing period.

However, in one frame period, each of the image display period and the touch sensing periods may be repeated twice or more.

In the image display period, a common voltage may be supplied to the common electrode 113, and a data voltage may be supplied to the pixel electrode PX through a corresponding data line.

In this instance, the common voltage may be supplied to the touch electrode TE. Thus, the touch sensing unit 600 may further include a switch that supplies the touch driving signal to the touch electrodes TE during the touch sensing period and during the image display period, supplies the common voltage to the touch electrode TE.

The touch electrode TE may be disposed on a lower end of the CF substrate 110 and may block light irradiated from the backlight unit that irradiates the light onto the liquid crystal display panel 100.

For example, as illustrated in FIGS. 5 and 6, the touch electrode TE may be arranged in a direction parallel to the data line and the gate line. In this instance, the data line and the gate line may overlap a black matrix 114, and thus, the light irradiated onto the data line and the gate line is not output to the outside through the TFT substrate 120.

However, the data line, the gate line, and the black matrix 114 cannot completely block the light. Therefore, the touch electrode TE which is arranged in parallel with the data line and the gate line may additionally block the light.

The above-described embodiment of the resent invention will be summarized below.

In order for the in-cell type to be applied to liquid crystal display panels having the TN mode, a problem where the common electrode cuts off an electric field generated based on the touch driving signal should be solved.

Thus, in the LCD apparatus according to an embodiment of the present invention, the CF substrate 110 including a color filter and the TFT substrate 120 including a transistor may be changed in their disposed positions. For example, in the LCD apparatus according to an embodiment of the present invention, the TFT substrate 120 may be disposed on the CF substrate 110 to contact an outer surface of the LCD apparatus. According to the above-described structure, a signal generated from the touch electrode TE included in the TFT substrate 120 is not cut off by the common electrode included in the CF substrate 110.

Therefore, by using the in-cell type, a touch is normally sensed even in liquid crystal display panels having the TN mode.

Moreover, in the embodiments of the present invention, the image display period and the touch sensing period may be sequentially repeated, and the touch electrodes included in the TFT substrate 120 may be driven by using the self-capacitive type during the touch sensing period, whereby a touch is sensed.

As described above, according to the embodiments of the present invention, the touch panel may be built into the liquid crystal display panel having the TN mode. Accordingly, an added value of the liquid crystal display panel having the TN mode increases.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display panel comprising:
   a thin film transistor (TFT) substrate including a plurality of touch electrodes, a plurality of subpixels respectively including a plurality of pixel electrodes, and a plurality of switching transistors;
   a color filter (CF) substrate including a plurality of common electrodes and a plurality of color filters respectively corresponding to the plurality of subpixels; and
   a liquid crystal layer disposed between the TFT substrate and the CF substrate, and liquid crystal being in the liquid crystal layer,
   wherein each of the plurality of touch electrodes comprises:
   a touch line connected in common to two or more adjacent subpixels which are disposed on one horizontal line; and
   a touch electrode line disposed to overlap a data line included in the TFT substrate and electrically connected to two or more adjacent touch lines which are along the data line,
   wherein the touch line comprises:
   a main touch line extending to a subpixel adjacent thereto; and
   a unit touch line branching from the main touch line,
   wherein the unit touch line is disposed along an outer portion of the pixel electrode included in each of the two or more adjacent subpixels, and
   wherein the main touch line and the unit touch line in each of the two or more adjacent subpixels form enclosed rectangular rings overlapping the two or more adjacent subpixels, respectively.

2. The liquid crystal display panel of claim 1, wherein the touch line comprises the unit touch line disposed in a tetragonal shape along an outer portion of a pixel electrode disposed in a subpixel including the touch line.

3. The liquid crystal display panel of claim 1, wherein the TFT substrate comprises:
   a base substrate;
   the plurality of touch electrode lines disposed on the base substrate;
   a first passivation layer disposed on the plurality of touch electrode lines;
   the plurality of touch lines disposed on the first passivation layer;
   a gate insulation layer disposed on the plurality of touch lines;

a plurality of data lines disposed on the gate insulation layer to overlap the plurality of touch electrode lines;

a second passivation layer disposed on the plurality of data lines; and the plurality of pixel electrodes disposed on the second passivation layer.

4. The liquid crystal display panel of claim 3, wherein each of the plurality of touch lines is electrically connected to a corresponding touch electrode line through a touch electrode contact hole provided in the first passivation layer.

5. The liquid crystal display panel of claim 3, wherein the plurality of touch electrodes are disposed on a lower end of the CF substrate; and at least one touch line of the plurality of touch lines is disposed between at least one touch electrode of the plurality of touch electrodes and at least one data line of the plurality of data lines, and wherein the at least one touch electrode, the at least one touch line and the at least one data line overlap each other and are configured to block a same light.

6. The liquid crystal display panel of claim 3, wherein the plurality of touch electrodes are arranged in a direction parallel to the plurality of data lines and a plurality of gate lines, and overlap a black matrix.

7. The liquid crystal display panel of claim 1, wherein a size of each of the plurality of subpixels is smaller than a size of each of the plurality of touch electrodes and, at least one of the plurality of touch electrodes is disposed over two or more of the plurality of subpixels.

8. The liquid crystal display panel of claim 1, wherein the plurality of touch electrodes are of a capacitive type and integrated as one body with the TFT substrate.

9. A liquid crystal display (LCD) apparatus comprising:
a liquid crystal display panel including a plurality of touch electrodes;

a panel driver driving the liquid crystal display panel; and a touch sensing unit configured to determine whether the liquid crystal display panel is touched, based on a plurality of sensing signals respectively received from the plurality of touch electrodes, wherein the liquid crystal display panel comprises:
a thin film transistor (TFT) substrate including the plurality of touch electrodes, a plurality of subpixels respectively including a plurality of pixel electrodes, and a plurality of switching transistors;
a color filter (CF) substrate including a plurality of common electrodes and a plurality of color filters respectively corresponding to the plurality of subpixels; and
a liquid crystal layer disposed between the TFT substrate and the CF substrate, and liquid crystal in the liquid crystal layer, wherein the TFT substrate is disposed on the CF substrate to contact an outside of the LCD apparatus, wherein each of the plurality of touch electrodes comprises:
a touch line connected in common to two or more adjacent subpixels which are disposed on one horizontal line; and
a touch electrode line disposed to overlap a data line included in the TFT substrate and electrically connected to two or more adjacent touch lines which are along the data line, wherein the touch line comprises:
a main touch line extending to a subpixel adjacent thereto; and
a unit touch line branching from the main touch line, wherein the unit touch line is disposed along an outer portion of the pixel electrode included in each of the two or more adjacent subpixels, and wherein the main touch line and the unit touch line in each of the two or more adjacent subpixels form enclosed rectangular rings overlapping the two or more adjacent subpixels, respectively.

10. The LCD apparatus of claim 9, wherein the touch line comprises the unit touch line disposed in a tetragonal shape along an outer portion of a pixel electrode disposed in a subpixel including the touch line.

11. The LCD apparatus of claim 9, wherein the TFT substrate comprises:
a base substrate;
the plurality of touch electrode lines disposed on the base substrate;
a first passivation layer disposed on the plurality of touch electrode lines;
the plurality of touch lines disposed on the first passivation layer;
a gate insulation layer disposed on the plurality of touch lines;
a plurality of data lines disposed on the gate insulation layer to overlap the plurality of touch electrode lines;
a second passivation layer disposed on the plurality of data lines; and
the plurality of pixel electrodes disposed on the second passivation layer.

12. The LCD apparatus of claim 11, wherein each of the plurality of touch lines is electrically connected to a corresponding touch electrode line through a touch electrode contact hole provided in the first passivation layer.

13. The LCD apparatus of claim 11, wherein the plurality of touch electrodes are disposed on a lower end of the CF substrate, and at least one touch line of the plurality of touch lines is disposed between at least one touch electrode of the plurality of touch electrodes, and at least one data line of the plurality of data lines, and wherein the at least one touch electrode, the at least one touch line and the at least one data line overlap each other and are configured to block a same light.

14. The LCD apparatus of claim 11, wherein the plurality of touch electrodes are arranged in a direction parallel to the plurality of data lines and a plurality of gate lines, and overlap a black matrix.

15. The LCD apparatus of claim 9, wherein a size of each of the plurality of subpixels is smaller than a size of each of the plurality of touch electrodes and, at least one of the plurality of touch electrodes is disposed over two or more of the plurality of subpixels.

16. The LCD apparatus of claim 9, wherein the plurality of touch electrodes are of a capacitive type and integrated as one body with the TFT substrate.

* * * * *